United States Patent
Rao et al.

(10) Patent No.: US 9,990,436 B2
(45) Date of Patent: *Jun. 5, 2018

(54) PERSONAL TRENDS MODULE

(71) Applicant: Yahoo!, Inc., Sunnyvale, CA (US)

(72) Inventors: Supreeth Rao, Sunnyvale, CA (US); Sudharsan Vasudevan, Sunnyvale, CA (US); Gopal Mor, Cupertino, CA (US); Utkarsh Shrivastava, San Jose, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/880,701

(22) Filed: Oct. 12, 2015

(65) Prior Publication Data

US 2016/0034592 A1      Feb. 4, 2016

Related U.S. Application Data

(63) Continuation of application No. 13/950,132, filed on Jul. 24, 2013, now Pat. No. 9,158,850.

(51) Int. Cl.
    *G06F 17/30*    (2006.01)
(52) U.S. Cl.
    CPC .... *G06F 17/30867* (2013.01); *G06F 17/3053* (2013.01); *G06F 17/30477* (2013.01); *G06F 17/30528* (2013.01)
(58) Field of Classification Search
    None
    See application file for complete search history.

(56) References Cited

U.S. PATENT DOCUMENTS

| | | | | |
|---|---|---|---|---|
| 7,788,260 B2* | 8/2010 | Lunt | ............ | G06F 17/30864 707/727 |
| 9,158,850 B2* | 10/2015 | Rao | ............ | G06F 17/30867 |
| 2010/0057645 A1* | 3/2010 | Lauritsen | ............ | G06N 5/042 706/11 |
| 2011/0173056 A1* | 7/2011 | D'Alessio | ............ | G06Q 30/0214 705/14.16 |
| 2012/0109966 A1* | 5/2012 | Liang | ............ | G06F 17/30643 707/740 |
| 2014/0189022 A1* | 7/2014 | Strumwasser | ............ | H04L 67/22 709/206 |

(Continued)

*Primary Examiner* — Wilson Lee
(74) *Attorney, Agent, or Firm* — Cooper Legal Group, LLC

(57) ABSTRACT

A system and method for generating a personalized trends module includes steps of: for a given user, producing a social timeline by logging content posted on the given user's accounts on social media sites; analyzing the social timeline for recently posted content to derive an interim summary of first trending topics for the given user; receiving from a content personalization platform an in-stream feed of second trending topics based on the user's recent on-line activity including page views, queries, and clicks; augmenting the social timeline with the second trending topics from the in-stream feed to produce an interim list of third trending topics; ranking the third trending topics by source category using a frequency index; selecting the highest ranking third trending topics from each source category; and presenting a personalized trends module with positions allocated to the highest ranking third trending topics.

20 Claims, 12 Drawing Sheets

(56) References Cited

U.S. PATENT DOCUMENTS

| 2014/0208234 A1* | 7/2014 | Amit | G06Q 30/0273 |
| | | | 715/753 |
| 2014/0280052 A1* | 9/2014 | Alonso | G06Q 30/0201 |
| | | | 707/722 |
| 2014/0282780 A1* | 9/2014 | Craib | H04N 21/4126 |
| | | | 725/110 |

* cited by examiner

Entry Log 610

| User | Location | Source | Cat | Content | Timestamp |
|---|---|---|---|---|---|
| User1 | USCASunn | Facebook | S | "long weekend coming up - any Netflix suggestions" | 20130415 10:33 |
| User1 | USCASunn | Facebook | S | "hv you seen Iron Man 3 yet" | 20130415 10:35 |
| User1 | USCASunn | Facebook | S | Like! Turmeric Restaurant in Sunnyvale | 20130415 10:50 |
| User1 | USCASunn | Facebook | S | Puthandu photos | 20130415 11:03 |
| User1 | USCASunn | Twitter | S | "At Tamil Festival for Puthandu" | 20130415 11:12 |
| User1 | USCASunn | Facebook | S | "Tamil New Year Food" | 20130415 11:25 |
| -- | -- | -- | | -- | -- |
| -- | -- | -- | | -- | -- |
| -- | -- | -- | | -- | -- |

| User1 | Netflix | 8 |
|---|---|---|
| User1 | IronMan | 7 |
| User1 | Puthandu | 10 |
| User1 | Restaurant | 5 |
| User1 | Tamil Festival | 9 |
| User1 | Sunnyvale | 6 |

*FIG. 6B*

PERSONAL TRENDS MODULE

RELATED APPLICATION

This application claims priority to and is a continuation of U.S. application Ser. No. 13/950,132, filed on Jul. 24, 2013, presently titled "PERSONAL TRENDS MODULE", which is incorporated herein.

FIELD

The instant disclosure disclosed broadly relates to the field of on-line trending topics, and more particularly relates to the field of personalized trending topics.

BACKGROUND

Trending topics are a popular on-line feature on many content publisher's websites, with captions such as: "Trending Now," "Now Trending," "Hot Topics," "What's Trending" and others. Trending topics provide a list (usually just ten items) of the currently popular topics in several categories such as news, entertainment, sports, finance, and just about any other topic of interest to web users. Trending topics generally appear in a prominent position on a content publisher's home page as hyperlinks, making it easy for a user to identify what is "trending" now. The user can then click on one of the listed topic to view informative content for that topic. The trending topics are based on web user's current interests, as derived from multiple data sources, such as search engines, social media sites, blogs, and other sources.

Referring now to the drawings and to FIG. 1 in particular, there is shown an example of a current "Trending Now" module 110 on a content publisher's home page (http://www.yahoo.com) 100. The "Trending Now" module features popular topics in news (finance, sports, celebrities, medicine), movies, books, consumer products, and many others. These trends are curated for the publisher's region and/or content consumers. For example, an entertainment site would not feature re-financing trends. The trending topics are a compilation of what interests the publisher's consumers. In some cases, such as in the case of a search engine such as Yahoo!®, the consumers are the general web population. Although the trending topics can be localized by region, and tailored to a publisher's consumers, they are not specific to an individual user.

Previous innovations are centered around ideas which consider trending search terms as having higher than normal frequency of 'search'/'use' for a topic (United States Patent Publication Number 2012/0271829 "System and Methods for Hot Topic Identification and Metadata," filed Apr. 25, 2011). A plurality of categories have also been identified based on the intersection of categories viewed by the user and the categories available via the system (U.S. Pat. No. 8,370,348, "Magazine Edition Recommendations," filed Dec. 6, 2011). However, none of the existing innovations provide trending topics customized for a user.

Therefore, there is a need for a method to enrich the user's on-line experience with customized trending topics.

SUMMARY

Briefly, according to an embodiment of the present disclosure, a method for generating a personalized trends module includes steps or acts of: for a given user, producing a social timeline by logging content posted on the given user's accounts on social media sites; analyzing the social timeline for recently posted content to derive an interim summary of first trending topics for the given user; receiving from a content personalization platform an in-stream feed of second trending topics based on the user's recent on-line activity including page views, queries, and clicks; augmenting the social timeline with the second trending topics from the in-stream feed to produce an interim list of third trending topics; ranking the third trending topics by source category using a frequency index; selecting the highest ranking third trending topics from each source category; and presenting a personalized trends module with positions allocated to the highest ranking third trending topics.

According to another embodiment of the present disclosure, an information processing system includes a processor device operably coupled with a memory. The memory includes computer-executable instructions that, when executed, cause a computer to perform steps of: for a given user, producing a social timeline by logging content posted on the given user's accounts on social media sites; analyzing the social timeline for recently posted content to derive an interim summary of first trending topics for the given user; receiving from a content personalization platform an in-stream feed of second trending topics based on the user's recent on-line activity including page views, queries, and clicks; augmenting the social timeline with the second trending topics from the in-stream feed to produce an interim list of third trending topics; ranking the third trending topics by source category using a frequency index; selecting the highest ranking third trending topics from each source category; and presenting a personalized trends module with positions allocated to the highest ranking third trending topics.

According to another embodiment of the present disclosure, a computer program product with a non-transitory computer-readable storage medium includes computer-executable instructions for performing the method steps above.

BRIEF DESCRIPTION OF THE SEVERAL VIEWS OF THE DRAWINGS

To describe the foregoing and other exemplary purposes, aspects, and advantages, we use the following detailed description of an exemplary embodiment of the disclosure with reference to the drawings, in which:

FIG. 6A is an exemplary entry log according to an embodiment of the present disclosure;

FIG. 6B is an exemplary table of <user,term,rank> triples, according to an embodiment of the present disclosure;

Figure 1:
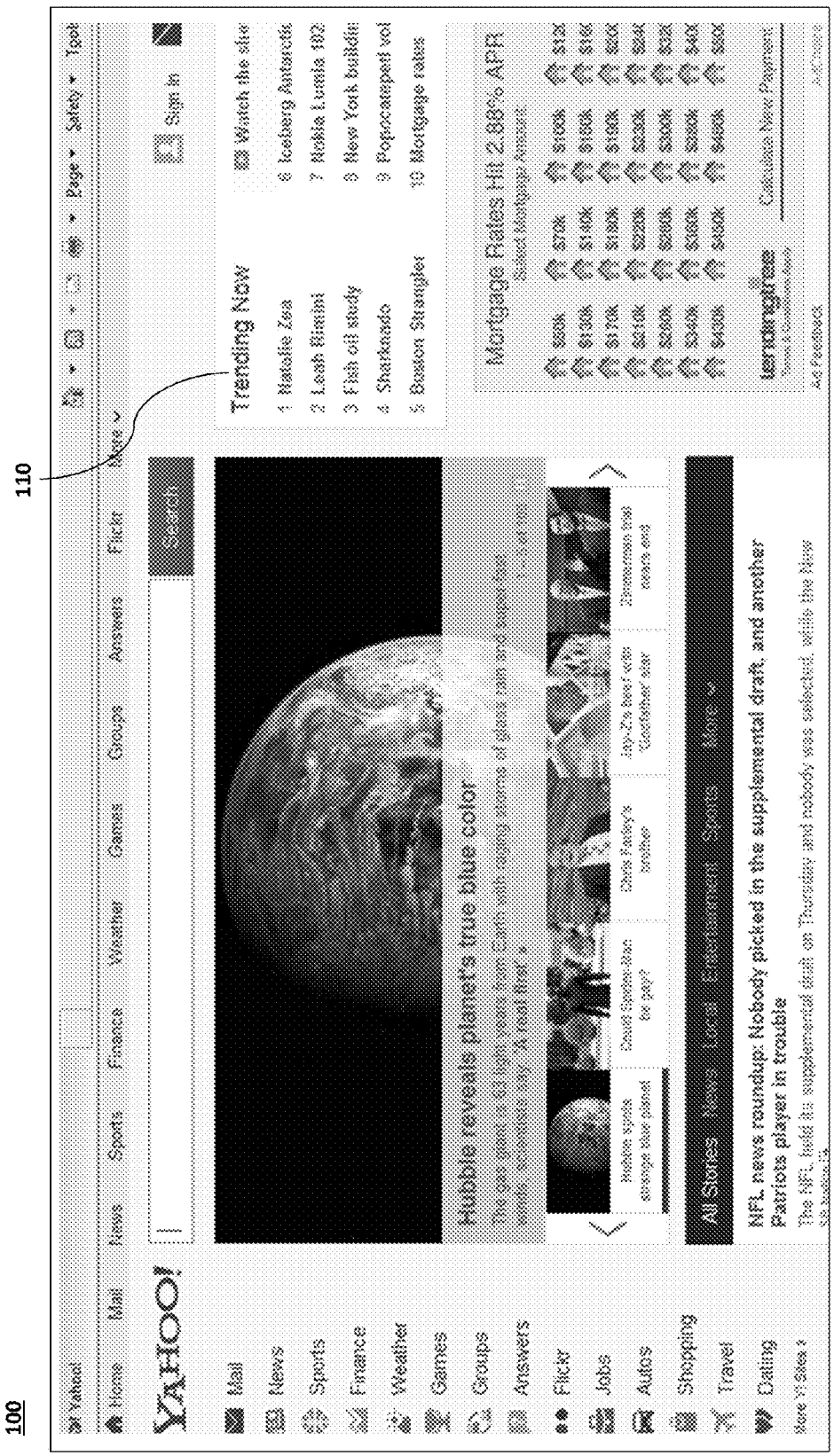
FIG. 1 is an exemplary screenshot depicting the state of the art in trending topics, according to the known art.

While the disclosure as claimed can be modified into alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the scope of the present disclosure.

DETAILED DESCRIPTION

Before describing in detail embodiments that are in accordance with the present disclosure, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

We describe an automated and personalized system and method for generating up-to-date trending topics that are customized for a given user. The personal trending topics are customized, meaning that we list the topics that have been curated specifically for the given user, rather than just listing global and/or locale-specific trending topics, as is currently done. We identify trending topics that are currently of interest to a given user, based on the user's own communications to/from his/her social contacts; and the user's web activity. In an embodiment of the present disclosure, the personal trending module highlights trending terms and topics based on the user's social media streams combined with search engine queries, blogs, posts, and the like.

Figure 11:
FIG. 11 shows a screenshot of BuzzFeed, a trending topic website, according to the known art.

For a given user, we require as an initial input into the process the user's identification, and the user's location (<user,location>). After linking to the user's social media accounts such as Facebook® ("FB") and Twitter®, we access the social media accounts to retrieve content posted to/from the user on the social media sites. The social content is then combined with an in-stream feed of locally trending topics that are streamed from an intelligent personalization platform such as Slingstone. The personalization platform uses known methods to derive topics that are of interest to a given location, by aggregating web activity which can take the form of page views, "shares," "saves," and others. From this combination an interim list is produced, providing a list of topics that are relevant to a given user at a given location. The interim list is then augmented by at least one top trending topic that is "hot" across the Web, received from the publisher's own Home Page, or from a trending site such as BuzzFeed®. See FIG. 11 for a screenshot of BuzzFeed's Home Page.

The personal trends process collects, combines, and summarizes signals from multiple streams in three categories: social (from FB and Twitter), in-stream (from SlingStone), and local/global (from BuzzFeed). The social input is derived from social media sites such as Twitter®, FB, and LinkedIn. The in-stream input is derived from content personalization engines such as Slingstone. The local/global input is derived from trending topic sites such as BuzzFeed that are constantly updating trending topics. In current trending topic modules, the topics reported as "trending now" are based on the topic categories discussed by the people whom the user follows. The personal trends methodology according to the present disclosure, however, employs a unique algorithm that builds a summary of multiple streams at any point in time. The key difference between the personal trends methodology and the state of the art can be illustrated with a simple example, as follows.

Using the current trending technology, assume a user follows "Bill Gates" on Twitter®. The current trending methodology assigns a trend topic of "Technology" to the user, meaning that every news-worthy tech trend will show up as a trending topic on the user's "Trending Now" section, even though the user may have been following Bill Gates because of an interest in his philanthropic pursuits.

Now we discuss how the personal trends module differs from the current method by more accurately personalizing the user's trending topics. We assume the same initial scenario (a user follows "Bill Gates" on Twitter®). Bill Gates tweets about "Relief program for flood victims." According to the personal trends methodology, "Relief program for flood victims" is captured in the user's Twitter® stream for the current timeline and parsed to extract the term "flood victims." This term "flood victims" is now a candidate for a personalized trending topic because this Tweet is part of the user's current timeline (as streamed from the user's Twitter® account).

The difference apparent to the user is in what appears on the Trending Topics list ("Technology" vs. "Flood Victims"). The difference in the methodology is in the capturing of a timeline summary for a point in time, rather than just a keyword match to a topic, or a local feed of trending topics. With the current methodology for trending topics, "flood victims" would only make it into the top 10 trends if a large amount of the users within the user's location (or throughout the Web) discuss this same issue. To recap, the personal trends are trends based on the combined view of a timeline from the user's different on-line streams, which can change at every minute. To this end, we can incorporate trending topic detection applications as part of our algorithm.

The present disclosure will now be described with respect to FIGS. 2 through 12 which are block diagrams and flowchart illustrations of embodiments of the present disclosure. It will be understood that each block of the flowchart illustrations and/or block diagrams, and combinations of blocks in the flowchart illustrations and/or block diagrams, can be implemented by computer program instructions. The flowchart and block diagrams in the Figures illustrate the architecture, functionality, and operation of possible implementations of systems, methods and computer program products according to various embodiments of the present disclosure.

In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Personal Trends Module.

Figure 3:
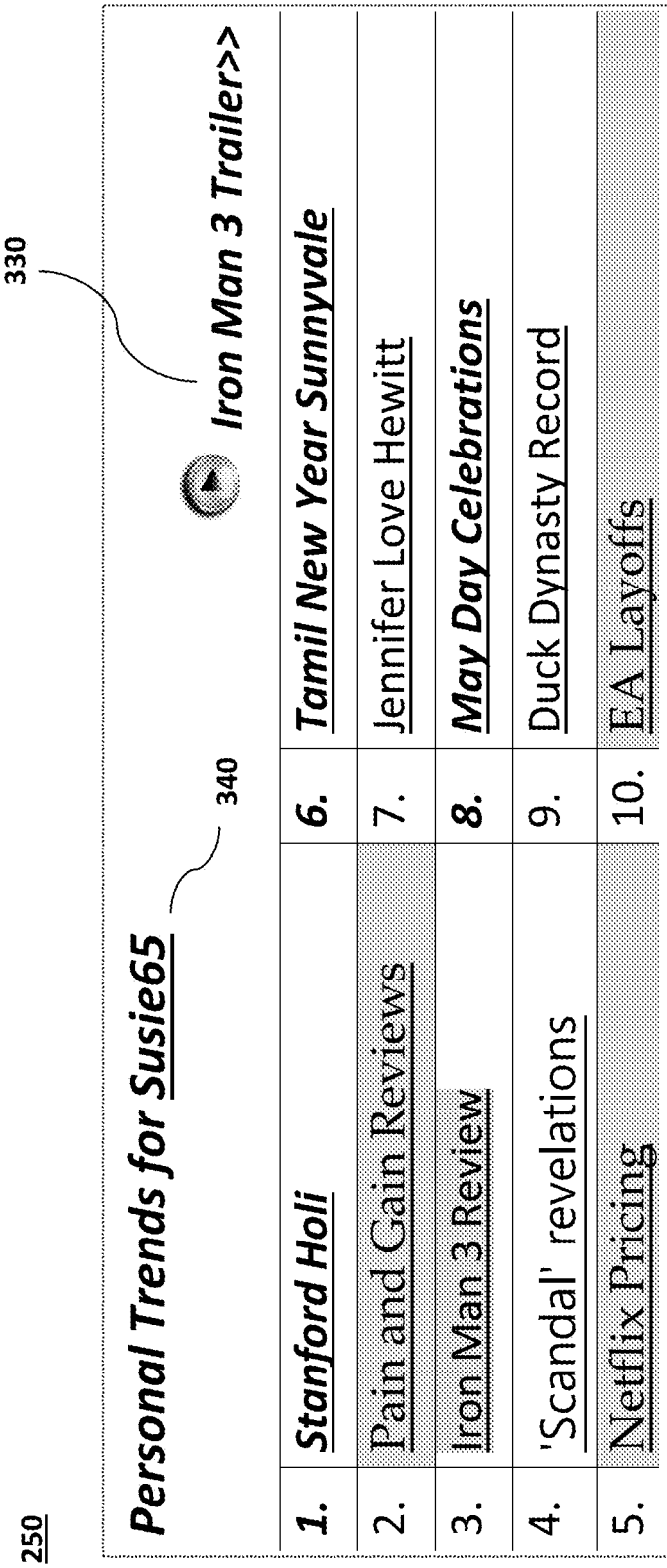
FIG. 3 is a close-up view of the personalized trends of FIG. 2, according to an embodiment of the present disclosure.

Referring now to FIG. 3 there is shown a close-up view of the personalized "Trending Now" module 250, according to an embodiment of the present disclosure. In this example, the module's placement follows the conventional placement for trending topics, but one with knowledge in the art will understand that the placement can vary within the spirit and scope of the disclosure. For example, the module 250 can be displayed as a banner across the top. In this example the Personalized Module 250 includes five different sections:

1. A sponsored trend ad 252 such as the Iron Man 3 trailer in position 3 (source=advertiser);

2. Local trends 254—Stanford Holi, Tamil new year Sunnyvale, May day celebrations in positions 1, 6, and 8 (source=content personalization pipeline);

3. Web Activity-based trend stream 255—Pain and Gain reviews, Netflix pricing, EA layoffs in positions 2, 5, and 10 (source=content personalization pipeline);

4. Behavioral trends 256—Duck dynasty record, Jennifer Love Hewitt in positions 9 and 7 (source=social media)

5. Global trends 258—Scandal Revelations in position 4 (source=publisher home page).

The module 250 as shown in FIG. 3 also includes video data 330 related to one of the trending topics. Optionally, the module 250 can include the user's name or sign-in 340. This information becomes available when the user's accounts are linked with the publisher.

Back-End Processing.

Figure 10:
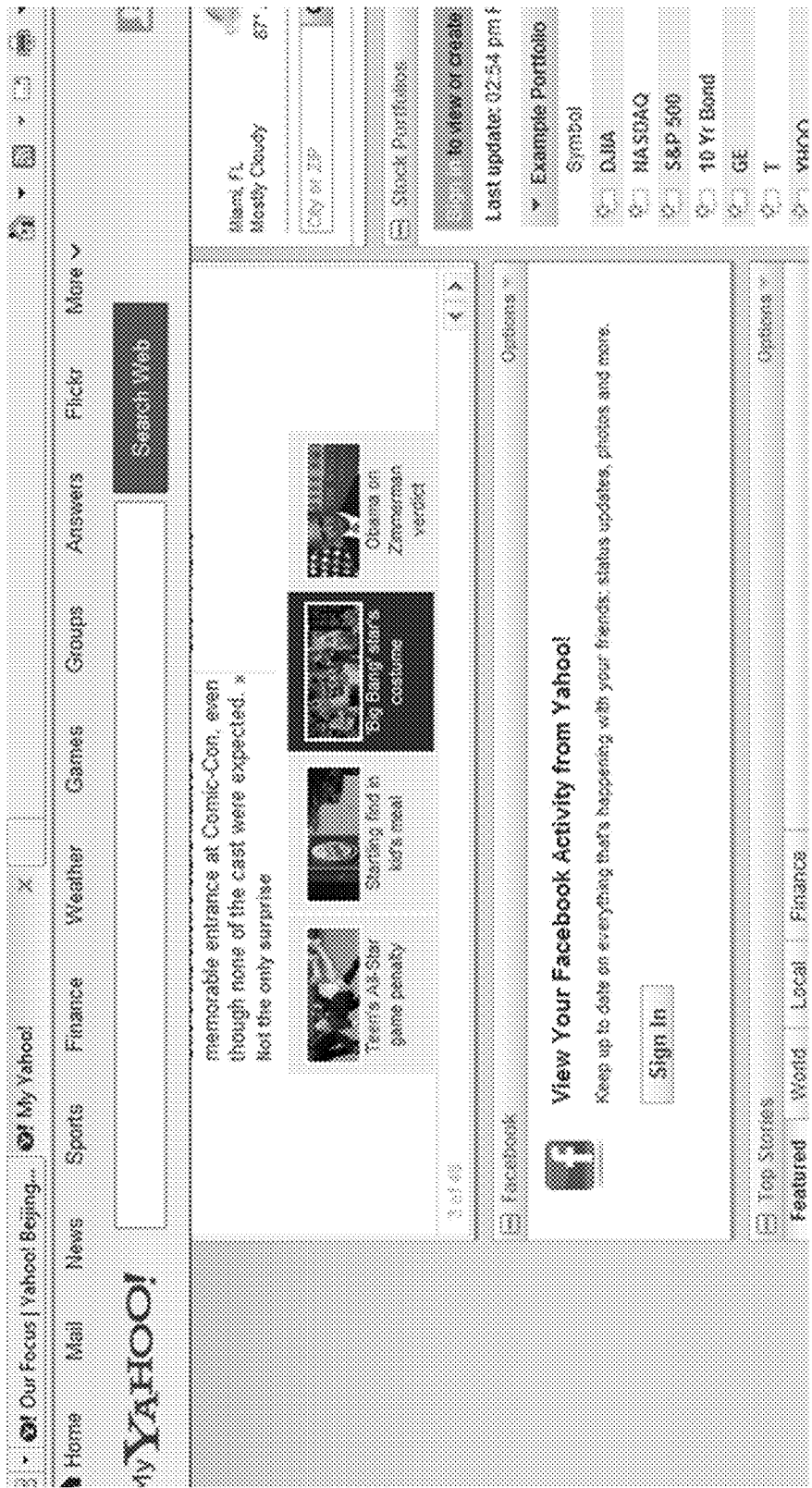
FIG. 10 shows an exemplary illustration of how a user's social media account is linked to the personal trending system, according to an embodiment of the present disclosure.

The underlying engine retrieves the content shared by the user on social media sites such as FB and Twitter® to generate social trending topics customized for the user. Ideally, we link the user's social media accounts to the publisher site where the trends are displayed. FIG. 10 shows one example of how this can be done. Once we have access to the user's social media accounts, we log the content that appears on the user's site. This can be both content originated by the user or content from others that is posted on the user's site.

We log, analyze, classify, and rank these entries for a period of time to produce a social timeline of social trending topics. The timeline is then combined with local trending streams from a content personalization pipeline such as Slingstone and also combined with global trending terms from the publisher to create an enriched, customized experience with personal trends displayed in the publisher's Home Page.

Personal Trends Schematic.

Figure 4:
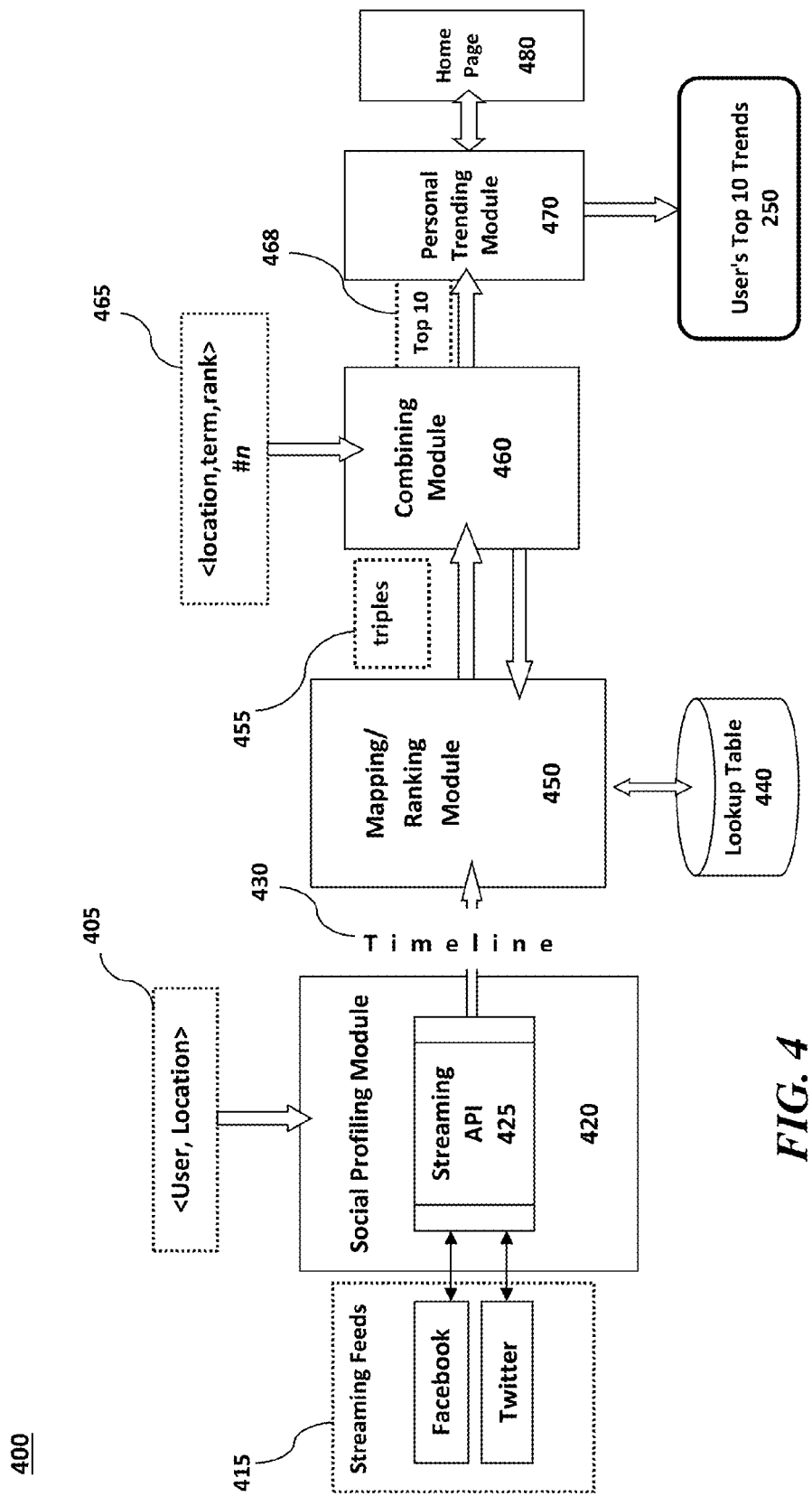
FIG. 4 is a simplified schematic diagram of the system for personalizing trends, according to an embodiment of the present disclosure.

Referring now to FIG. 4 there is shown a high-level schematic diagram 400 of the personal trends system, according to an embodiment of the present disclosure. The initial input to the process is a tuple 405 of the user and the user's location <user,location> as shown in FIG. 6. The Social Profiling Module 420, running an application program interface 425, uses this identification of the user to access the user's on-line networks, such as the social media accounts FB and Twitter®. Using streaming feeds 415 from the user's social media accounts. The Social Profiling Module 420 logs, parses and analyzes the current social media content and activity associated with the user for a given period of time to extract terms of interest. For example, the user's Twitter® "tweets" are parsed to extract terms of interest. The user's FB "Likes" are also parsed, as are any comments posted on the user's "Wall" in FB. Other streams which can be analyzed are LinkedIn®, Yahoo! Home Run stream, Reddit, Digg, and others.

The Social Profiling Module 420 parses the streams to extract terms of interest and logs each occurrence of a term of interest, the timestamp, and from what source it originated. After parsing the input streams to extract trending terms and logging the trending terms with the number of occurrences, the Social Profiling Module 420 outputs a timeline with the user's current topics of interest from social media. Added to this timeline are the in-stream topics derived from a content personalization platform. These in-stream topics provide the currently trending topics as derived from the user's on-line activity (page views, clicks, queries). This provides a comprehensive view of topics that are relevant to the user at the current time.

Next, the Mapping/Ranking Module 450 receives the timeline (which is really a log of all of the terms of interest, where they originated, and their number of occurrences). The Mapping/Ranking Module 450 assigns ranks to the terms using a frequency index. After ranking the terms, the Mapping/Ranking Module 450 outputs a pre-defined number n of terms for each category (social and in-stream trends) by triples of <user,term,rank> in each category. The ranking is based on a "buzz" score which is an index of the frequency with which the terms appear.

At this point in the process we have ranked social and in-stream trends. Now we introduce the local/global trends which are prepared by a number of sites such as BuzzFeed. These feeds are updated frequently and generally localized. Within a large market like the United States, the trend feeds can be localized to a region or even a city. In smaller markets, the feeds are localized to the country as whole.

Now that the Mapping/Ranking Module 450 has two source categories of content, the module 450 also ranks the categories by their occurrences to output a triple for <user,category,rank>. The first set of triples <user,term,rank> provides a list of ranked terms from which we are able to select the highest ranked terms. The second set of triples <user,category,rank> provides a ranked list of categories, ranked by usage. Let's say we define n as 150; therefore we produce up to (n/2) ranked terms for each of the two initial categories (social, in-stream). The categories themselves are ranked by usage. For example, if most of the input for the current timeline is retrieved from social media, then the social category is ranked highest for this timeline. From this interim list of n triples, we select the $n_P$ top-ranked personal terms.

In one embodiment of the present disclosure, we weight the categories by occurrence and thereby select a subset $n_P$ of triples <user,term,rank> by weighted category. For example, if most of the timeline entries occur in the social category, then out of $n_P$ possible terms, we select a higher proportion of them to be social terms. However, if the user's FB activity has been very light, we can rely more heavily on the in-stream feeds.

The Mapping/Ranking Module 450 outputs the $n_P$ triples 455 to the Combining Module 460. The Combining Module 460 combines the highest-ranked topics from the two categories (social, in-stream) on a periodic basis. The Combining Module 460 also receives as input the top $n_G$ trending topics associated with the user's location <location,term, rank> from a publisher site or a trending site such as BuzzNews. The personal trending algorithm can interface with known trending topic detection applications to receive the top $n_G$ trending topics by location.

Assuming a final personal trends module containing $n_T$=10 topics, we select from one to five of the highest ranked trending local/global topics G to combine with between five to nine of the highest ranked triples 455 P from the social and in-stream categories, for a total of 10 T Trending Topics (or whatever number has been selected for display). The output is a list 468 of the top $n_T$ personal trends T customized for the user, including local/global trending topics G that are trending within the web community. In an embodiment of the instant disclosure, the list includes 10 trends, but this amount can vary. The Personal Trending Module 470 receives this list 468 and interfaces with the publisher to serve the user's personal trends 250 on the Home Page 480. As seen with the example of FIG. 3, we are also able to reserve a position for a sponsored trend.

Methodology.

Figure 5:
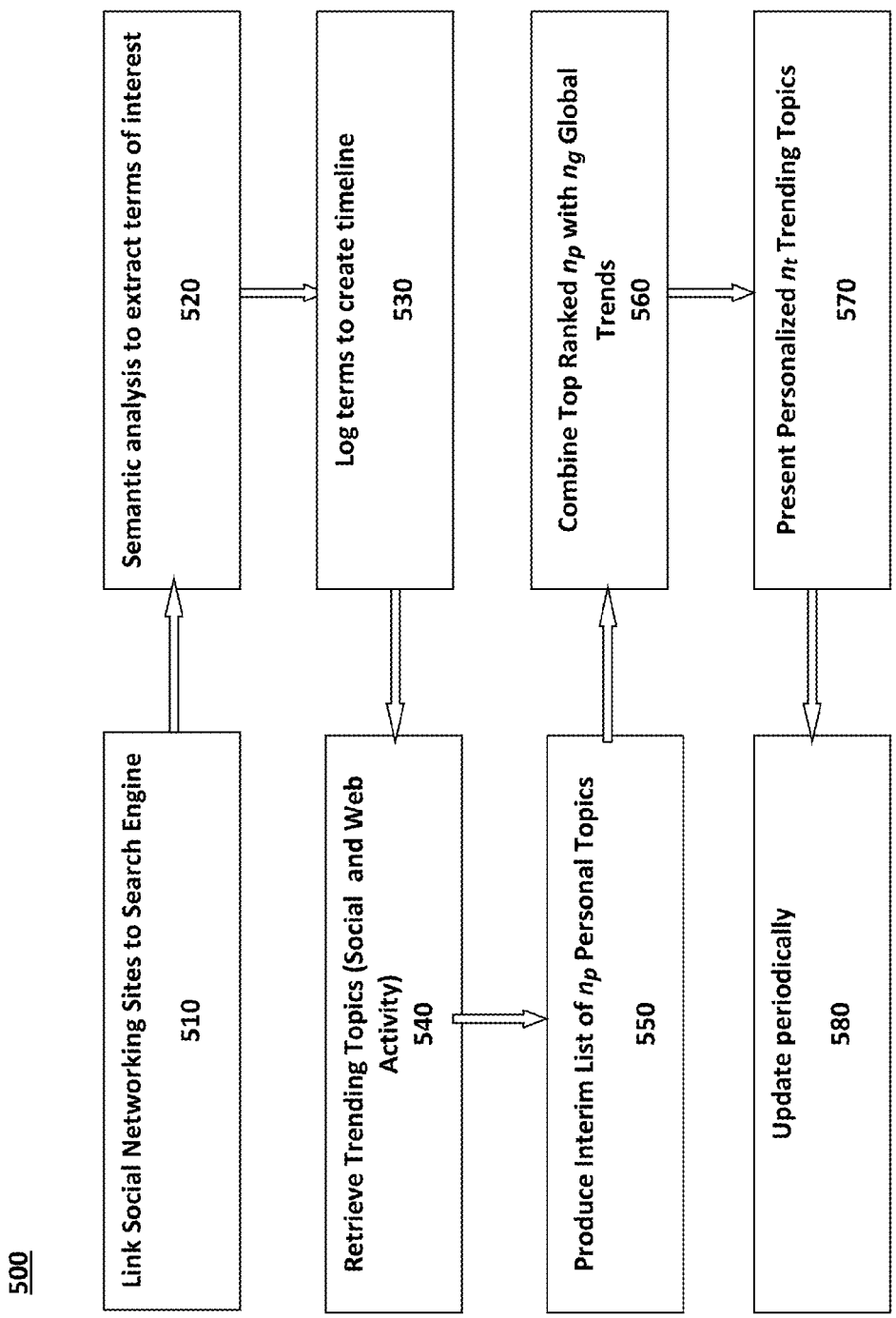
FIG. 5 is a high-level flowchart of the method for generating personalized trends, according to an embodiment of the present disclosure.

Referring now to FIG. 5, there is shown a high-level flowchart 500 of the method for generating a personalized trending module, according to an embodiment of the instant disclosure. In step 510 we link a user's social media sites, such as Facebook® and Twitter®, to a publisher site such as Yahoo! FIG. 10 shows an example of how a user can sign up to link sites. We use connected accounts wherein the user has registered and logs in to access the accounts. We do this so that we can acquire access to the content shared on the user's social media sites. By accessing the social media sites, we can stream in the content shared by the user and the user's contacts. This provides an indication of the user's current interests.

We acknowledge that any recent web activity by the user (apart from the social media) can also provide insight into the user's interests, therefore we interface with a known content personalization platform to receive in-stream feeds of trending topics based on the user's Internet activity (queries, clicks, views). Once we have access to the social media content and the in-stream feeds, we parse the input to extract terms of interest in step 520. In step 530 we build the timeline 430 by logging the entries by user id (from the login sessions) and include the source category (social or in-stream Web activity trends).

We derive social trending signals from the user's perspective by analyzing the timeline 430 in the Mapping/Ranking Module 450 in step 540. This includes ranking the terms and the categories to output triples of <user,term,rank> and <user,category,rank>. We use content analysis tools such as yql.content.analyze from Yahoo!® From the timeline 430 we retrieve the highest-ranked current $n_P$ topics/terms that are interesting to the user (trending now for the user) as gleaned from the shared content on the user's social media sites. For example, assume the user is from the Tamil ethnic group native to India and Sri Lanka. From the user's posts on social media sites, we log multiple references to "Puthandu," which is the Tamil New Year, as shown in FIG. 6A. With a ranking index of 1 to 10, with 10 being the highest, we assign the highest rank to this term because of its many occurrences in the social media streams (<user1, Puthandu,10>). See FIG. 6B. Given that the Tamils make up such a small percentage of the world population, "Tamil New Year" is not likely to be a "Trending Now" topic under current methods. However, because the references to "Puthandu" were captured from the user's current social streams, we are able to provide "Tamil New Year" as a trending topic for this user.

Figure 8:
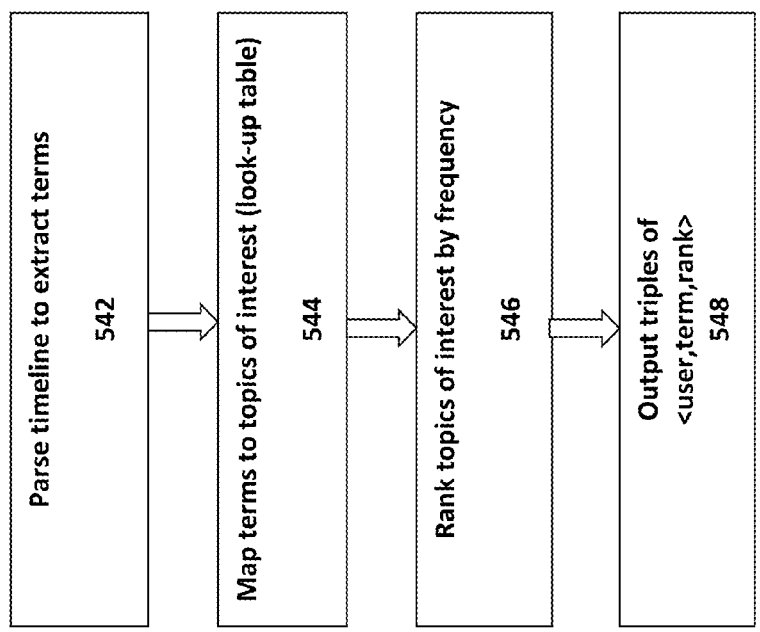
FIG. 8 is a lower-level flowchart of the analyzing step 540 from the flowchart of FIG. 5, according to an embodiment of the present disclosure.
Figure 9:
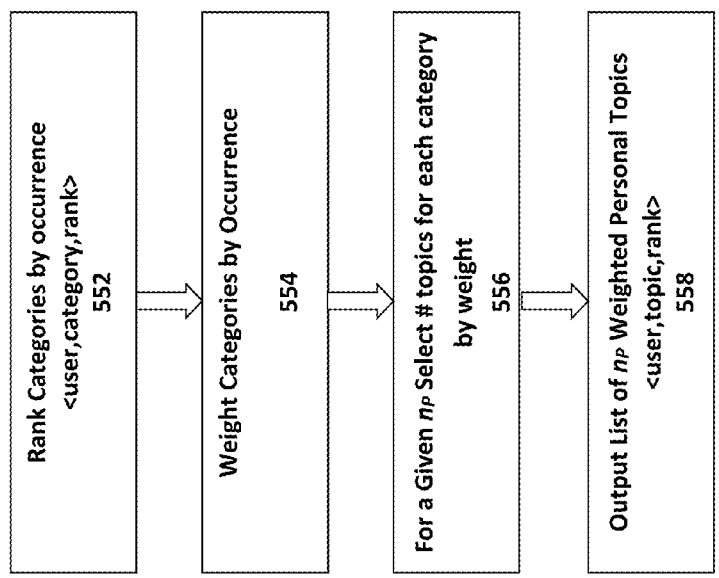
FIG. 9 is a lower-level flowchart of the listing step 550 from the flowchart of FIG. 5, according to an embodiment of the present disclosure.

Referring now to FIG. 8, we show a lower-level flowchart of step 540. First in step 542 we parse the timeline, performing semantic analysis to extract terms that may be associated with topics of interest. We can employ known trending topic detection algorithms to extract the terms. Once we have the topics of interest, we rank the topics by their frequency of occurrence in the timeline 430. Lastly we output the n ranked topics of interest in a list of triples of the format <user,term,rank>.

Returning now to FIG. 5, we group the n topics into two categories (social and Web activity trends) to produce an interim list of the top trends that are significant for a given user. In step 550 we select the top $n_P$ trending topics for the user from the interim list. In step 560 we combine the interim list of the $n_P$ user's personal top trending topics with $n_G$ global/local trending topics from the front page of the publisher's site, or from another venue such as TimeSense or BuzzFeed. We now rank the list of topics from all three source categories (local/global, social, Web activity). The combined list of $n_T$ ($n_G+n_P$) provides trends that are customized for the user.

Figure 2:
FIG. 2 is an exemplary screenshot depicting personalized trends, according to an embodiment of the present disclosure.

In step 570 we present the list of $n_T$ personalized trends to the user; an example of which is shown in FIG. 2. In order to distinguish the user-derived trends from the global trends, we can present one set in a distinguishable manner, perhaps by using different text colors, font, highlighting, placement, or the like. Referring again to FIG. 3 we can distinguish the different categories of topics using color (not shown here), font, size, shading, highlighting, and the like.

In step 580 we periodically update the topics to keep them fresh and relevant. We can update every hour, every half-hour, quarter-hour or as often as deemed necessary. The updating step involves running steps 520 through 570 at periodic intervals. We can stagger the updates so that we perform updates on the timeline for the Web activity and social topics at a different rate than we update the global/local trending streams. The updates can be tied into the level of activity on the social media and other sites. For example, if there is a burst of activity, we perform the updates more often. Every update period, at batch intervals, we retrieve the timeline 430 for the user. We analyze the timeline 430 and select the terms/current trend categories that appear interesting to the user.

As updates occur we can adjust the number $n_G$ of global trends that appear on the Home Page 480 to increase or decrease depending on the user involvement with the personalized top 10 topics 250. Because we log the user's clicks from the Home Page 480, we are able to receive feedback on the user's perceived relevance of the topics selected by the personal trends algorithm. For example, if we list "Iron Man 3 trailer" on the personalized top 10 topics and the user subsequently clicks on that item to view more information or to buy movie tickets, then "Iron Man 3 trailer" will appear on the subsequent timeline from the Web activity stream, thus validating its selection.

Likewise, if "Iron Man 3 trailer" is listed on the personalized top 10 topics and no activity in either social media or Web activity for "Iron Man 3" appears in subsequent timelines, it is not likely to stay in the top 10.

Monetization.

In an embodiment of the present disclosure, we can include one or more positions for sponsored trends within the list of top personal trends 250. The one or more positions can be sold for placement of search or listings ads either using location-based or interest-based categories. The sponsored ad position(s) can become a new ad-unit, called sponsored trends. The personal trends module 250 as shown in FIG. 3 can also include advertisements, such as the Iron Man 3 trailer 330.

In another embodiment of the present disclosure, the updates to generate a current list of the top personal trends 250 can be done as a service for a third party such as an advertiser or publisher. In this embodiment the module 250 will most likely include a sponsored ad and/or an advertisement.

Mobile App Embodiment

Figure 7:
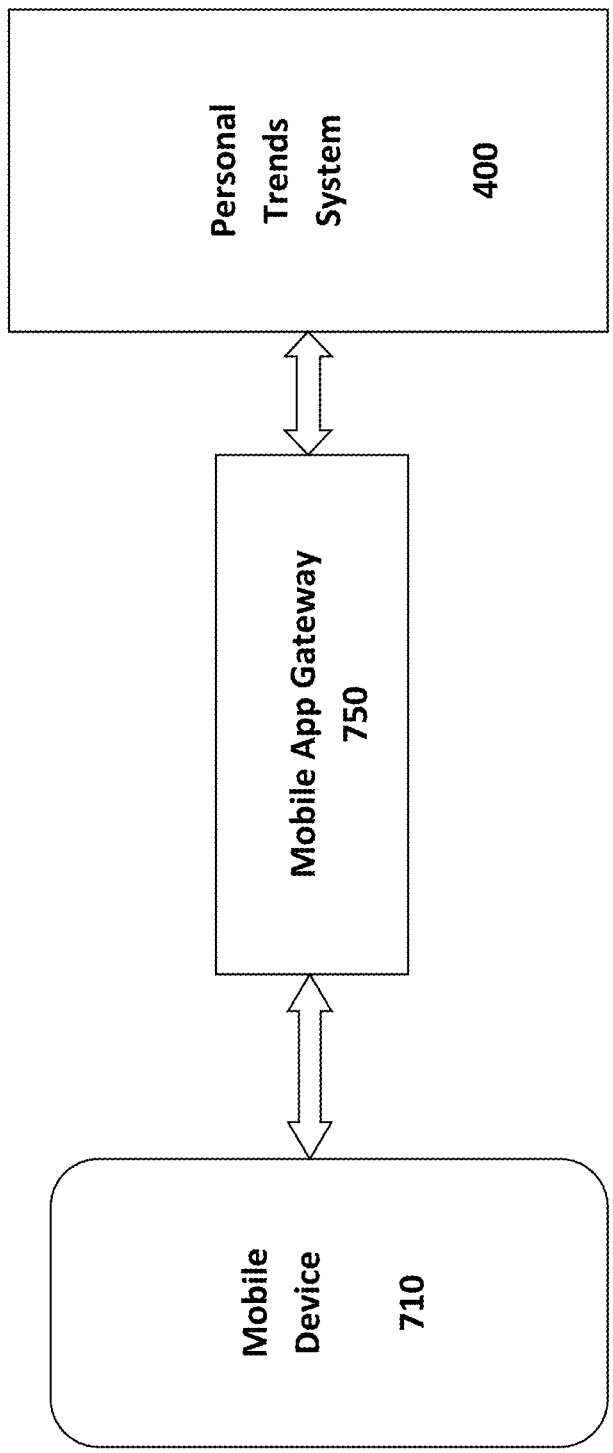
FIG. 7 is a simplified block diagram of the mobile application embodiment, according to the present disclosure.

Referring now to FIG. 7, using the Mobile App Gateway 750, we are able serve personal trends on a user's mobile device 710. The user device 710 simply accesses the Mobile App Gateway 750 through known protocols in order to use the Personal Trends System 400.

Benefits and Advantages of the Disclosure.

With trending topics that are personalized for a user, the time spent on a publisher's home page trending now stories will increase as users see more relevance in the trending topics. Personalized topics, because they appear more relevant to the user, will lead to higher CTRs (click-through rates) and therefore larger revenue and search traffic. Sponsored trends will become a new ad-format that will drive more revenue to advertisers and publishers.

We enrich the quality of trending news for the user by filtering out other 'hot topics' which might not be relevant to the user, thereby generating more clicks/revenue per click. We engage the user by providing him/her with the ability to view content of his/her choice over a period of time. As the users' choices change it is reflected in the personal trending module.

Hardware Embodiment

As will be appreciated by one skilled in the art, aspects of the present disclosure may be embodied as a system, computer-implemented method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more non-transitory computer readable medium(s) having computer readable program code embodied thereon.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

It will be understood that each block of the foregoing flowchart illustrations and/or block diagrams, and combinations of blocks in the flowchart illustrations and/or block diagrams, can be implemented by computer program instructions. These computer program instructions may be provided to a processor device of a general purpose computer, special purpose computer, or other programmable data processing apparatus to produce a machine, such that the instructions, which execute via the processor device of the computer or other programmable data processing apparatus, cause a computer to implement the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 12:
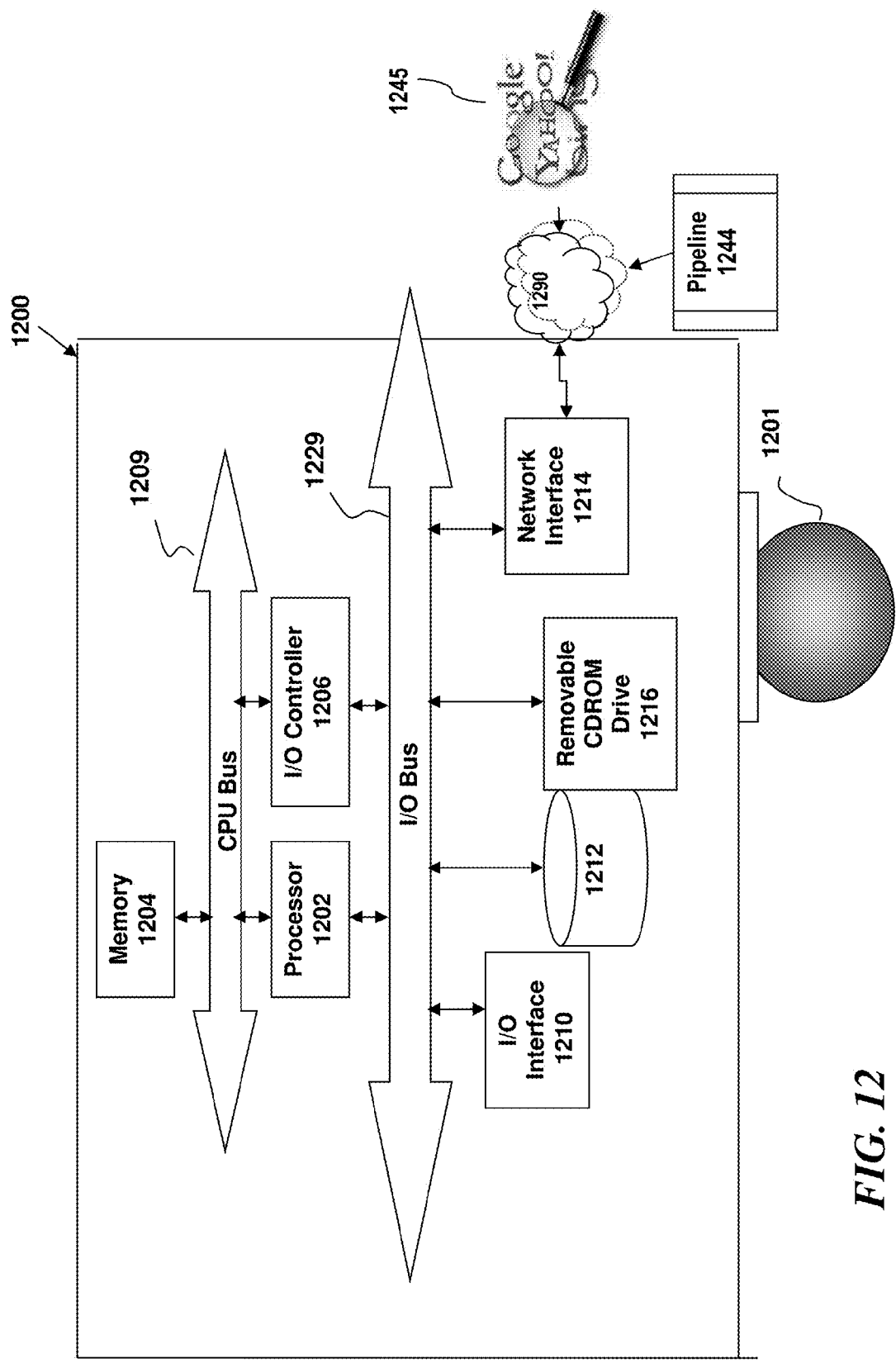
FIG. 12 is a simplified block diagram of the hardware components required to implement the personal trending methodology, according to an embodiment of the present disclosure.

Referring now to FIG. 12, there is provided a simplified pictorial illustration of a computerized information processing system 1200 for generating Personal Trends in which the present disclosure may be implemented. For purposes of this disclosure, computer system 1200 may represent any type of computer, information processing system or other programmable electronic device, including a client computer, a server computer, a portable computer, an embedded controller, a personal digital assistant, and so on. The computer system 1200 may be a stand-alone device, but is more than likely networked into a larger system. Computer system 1200, illustrated for exemplary purposes as a networked computing device, is in communication with other networked computing devices (not shown) via network interface 1214. As will be appreciated by those of ordinary skill in the art, network interface 1214 may be embodied using conventional networking technologies and may include one or more of the following: local area networks, wide area networks, intranets, public Internet 1290 and the like.

In general, the routines which are executed when implementing these embodiments, whether implemented as part of an operating system or a specific application, component, program, object, module or sequence of instructions, will be referred to herein as computer programs, or simply programs. The computer programs typically include one or more instructions that are resident at various times in various memory and storage devices in an information processing or handling system such as a computer, and that, when read and executed by one or more processors, cause that system to perform the steps necessary to execute steps or elements embodying the various aspects of the instant disclosure.

Throughout the description herein, an embodiment of the instant disclosure is illustrated with aspects of the instant disclosure embodied solely on computer system 1200. As will be appreciated by those of ordinary skill in the art, aspects of the instant disclosure may be distributed amongst one or more networked computing devices which interact with computer system 100 via one or more data networks such as, for example, network 1214. However, for ease of understanding, aspects of the instant disclosure have been embodied in a single computing device—computer system 1200.

Computer system 1200 includes inter alia processing device 1202 which communicates with an input/output subsystem 1206, memory 1204, storage 1212 and network 1214. The processor device 1202 is operably coupled with a communication infrastructure 1229 (e.g., a communications bus, cross-over bar, or network). The processor device 1202 may be a general or special purpose microprocessor operating under control of computer program instructions executed from memory 1204 on program data. The processor device 1202 may include a number of special purpose sub-processors such as a comparator engine, each sub-processor for executing particular portions of the computer program instructions. Each sub-processor may be a separate circuit able to operate substantially in parallel with the other sub-processors.

The memory 1204 may be partitioned or otherwise mapped to reflect the boundaries of the various memory subcomponents. Memory 1204 may include both volatile and persistent memory for the storage of: operational instructions for execution by CPU 1202, data registers, application storage and the like. Memory 104 preferably includes a combination of random access memory (RAM), read only memory (ROM) and persistent memory such as that provided by a hard disk drive. The computer instructions/applications that are stored in memory 1204 are executed by processor 1202. The computer instructions/applications and program data can also be stored in a hard disk drive or mass storage 1212 for execution by processor device 1202.

Those skilled in the art will appreciate that the functionality implemented within the blocks illustrated in the diagram may be implemented as separate components or the functionality of several or all of the blocks may be implemented within a single component. For example, the functionality for the Combining Module 460 may be included in the same component as the Mapping/Ranking Module 450.

The I/O subsystem 1206 may comprise various end user interfaces such as a display, a keyboards, and a mouse. The I/O subsystem 1206 may further include an I/O interface 1210, a connection to a network 1214 such as a local-area network (LAN) or wide-area network (WAN) such as the Internet 1290.

The computer system 1200 may also include a removable storage drive 1216, representing a floppy disk drive, a magnetic tape drive, an optical disk drive, etc. The removable storage drive 1216 reads from and/or writes to a removable storage unit 1201 in a manner well known to those having ordinary skill in the art. Removable storage unit 1201, represents a floppy disk, a compact disc, magnetic tape, optical disk, CD-ROM, DVD-ROM, etc. which is read by and written to by removable storage drive 1216. As will be appreciated, the removable storage unit 1201 includes a non-transitory computer readable medium having stored therein computer software and/or data.

The computer system 1200 may also include a communications interface 1212. Communications interface 1212 allows software and data to be transferred between the computer system and external devices. Examples of communications interface 1212 may include a modem, a network interface (such as an Ethernet card), a communications port, a PCMCIA slot and card, etc. Software and data transferred via communications interface 1212 are in the form of signals which may be, for example, electronic, electromagnetic, optical, or other signals capable of being received by communications interface 1212.

In this document, the terms "computer program medium," "computer usable medium," and "computer readable medium" are used to generally refer to both transitory and non-transitory media such as main memory 1204, removable storage drive 1216, a hard disk installed in hard disk drive, and signals. These computer program products are means for providing software to the computer system 1200. The computer readable medium 1201 allows the computer system 1200 to read data, instructions, messages or message packets, and other computer readable information from the computer readable medium 1201.

The system 1200 interfaces with search engines 1245 and content personalization platforms 1244 through the Internet 1290. It should also be noted that storage 1212, though shown here as residing solely within the computer 1200, may be a combination of local and remote storage. The storage 1212 is used to store timelines, logs and may include look-up tables, graphs, charts, and the like.

Therefore, while there has been described what is presently considered to be the preferred embodiment, it will understood by those skilled in the art that other modifications can be made within the spirit of the instant disclosure. The above description(s) of embodiment(s) is not intended to be exhaustive or limiting in scope. The embodiment(s), as described, were chosen in order to explain the principles of the instant disclosure, show its practical application, and enable those with ordinary skill in the art to understand how to make and use the instant disclosure. It should be understood that the instant disclosure is not limited to the embodiment(s) described above, but rather should be interpreted within the full meaning and scope of the appended claims.

What is claimed is:

1. A computer-implemented method for presenting a personalized trends module, comprising:
   determining first trending topics associated with a user;
   receiving, via a first network communication, an in-stream feed of second trending topics based on on-line activity, of the user, comprising at least one of a page view, a query, or a click;
   augmenting a social timeline associated with the user with at least one of the second trending topics to produce an interim list of third trending topics, wherein the social timeline is produced by logging content, retrieved via a second network communication, posted on one or more accounts of the user on one or more social media sites, wherein recently posted content on the social timeline corresponds to a summary of the first trending topics;
   ranking the third trending topics by source category using a frequency index;
   selecting a subset of highest ranked third trending topics from a first source category; and
   controlling a graphical user interface on a computer display to display a personalized trends module highlighting at least some of the subset of the highest ranked third trending topics to distinguish at least some of the subset of the highest ranked third trending topics from one or more other topics by allocating one or more positions to at least some of the subset of the highest ranked third trending topics to customize an online experience of the user with customized trending topics, at least some of the method implemented via a processor device comprising hardware.

2. The computer-implemented method of claim 1 further comprising:
assigning a first appearance to a first topic of the second trending topics based upon a first source category associated with the first topic and a second appearance different than the first appearance to a second topic of the third trending topics based upon a second source category associated with the second topic.

3. The computer-implemented method of claim 1 further comprising:
analyzing the social timeline for content to derive the summary of the first trending topics for the user.

4. The computer-implemented method of claim 1 further comprising:
presenting an identifier of the user in the personalized trends module.

5. The computer-implemented method of claim 1 further comprising:
performing at least one of the receiving, the augmenting, the ranking, the selecting, or the controlling at one or more periodic intervals.

6. The computer-implemented method of claim 1 further comprising:
allocating a position for a sponsored trending topic in the personalized trends module.

7. The computer-implemented method of claim 1 further comprising:
allocating a position for a global trending topic in the personalized trends module.

8. An information processing system, comprising:
a processor device comprising hardware; and
a memory operably coupled with the processor device, the memory comprising computer-executable instructions causing a computer to perform acts of:
determining first trending topics associated with a user;
receiving, via a first network communication, an in-stream feed of second trending topics based on on-line activity of the user;
augmenting a social timeline associated with the user with at least one of the second trending topics to produce an interim list of third trending topics, wherein the social timeline is produced by logging content, retrieved via a second network communication, posted on one or more accounts of the user, wherein recently posted content on the social timeline corresponds to a summary of the first trending topics;
ranking the third trending topics using a frequency index;
selecting a subset of highest ranked third trending topics; and
controlling a graphical user interface on a computer display to display a personalized trends module highlighting at least some of the subset of the highest ranked third trending topics to distinguish at least some of the subset of the highest ranked third trending topics from one or more other topics by allocating one or more positions to at least some of the subset of the highest ranked third trending topics to customize an online experience of the user with customized trending topics.

9. The information processing system of claim 8 wherein the computer-executable instructions further comprise instructions for:
assigning a first appearance to a first topic of the second trending topics based upon a first source category associated with the first topic and a second appearance different than the first appearance to a second topic of the third trending topics based upon a second source category associated with the second topic.

10. The information processing system of claim 8 wherein the computer-executable instructions further comprise instructions for:
analyzing the social timeline for content to derive the summary of the first trending topics for the user.

11. The information processing system of claim 8 wherein the computer-executable instructions further comprise instructions for:
presenting an identifier of the user in the personalized trends module.

12. The information processing system of claim 8 wherein the computer-executable instructions further comprise instructions for:
performing at least one of the receiving, the augmenting, the ranking, the selecting, or the presenting at one or more periodic intervals.

13. The information processing system of claim 8 wherein the computer-executable instructions further comprise instructions for:
allocating a position for a sponsored trending topic in the personalized trends module.

14. The information processing system of claim 8 wherein the computer-executable instructions further comprise instructions for:
allocating a position for a global trending topic in the personalized trends module.

15. A computer program product comprising a non-transitory computer readable storage medium storing computer-executable instructions that, when executed, cause a computer to perform acts of:
determining first trending topics associated with a user;
receiving, via a first network communication, an in-stream feed of second trending topics based on on-line activity of the user;
augmenting a social timeline associated with the user with at least one of the second trending topics to produce an interim list of third trending topics, wherein the social timeline is produced by logging content, retrieved via a second network communication, posted on one or more accounts of the user on one or more social media sites;
ranking the third trending topics;
selecting a subset of ranked third trending topics; and
controlling a graphical user interface on a computer display to display a personalized trends module highlighting at least some of the subset of the ranked third trending topics to distinguish at least some of the subset of the ranked third trending topics from one or more other topics by allocating one or more positions to at least some of the subset of the ranked third trending topics to customize an online experience of the user with customized trending topics, at least some of the acts implemented via a processor device comprising hardware.

16. The computer program product of claim 15 wherein the computer-executable instructions further cause a computer to perform:
assigning a first appearance to a first topic of the second trending topics based upon a first source category associated with the first topic and a second appearance different than the first appearance to a second topic of the third trending topics based upon a second source category associated with the second topic.

17. The computer program product of claim 15 wherein the computer-executable instructions further cause a computer to perform:
analyzing the social timeline for content to derive a summary of the first trending topics for the user.

18. The computer program product of claim 15 wherein the computer-executable instructions further cause a computer to perform:
presenting an identifier of the user in the personalized trends module.

19. The computer program product of claim 15 wherein the computer-executable instructions further cause a computer to perform:
performing at least one of the receiving, the augmenting, the ranking, the selecting, or the controlling at one or more periodic intervals.

20. The computer program product of claim 15 wherein the computer-executable instructions further cause a computer to perform at least one of:
allocating a position for a sponsored trending topic in the personalized trends module; or
allocating a position for a global trending topic in the personalized trends module.

* * * * *